United States Patent
Patel et al.

(10) Patent No.: US 8,943,182 B2
(45) Date of Patent: Jan. 27, 2015

(54) METHOD AND SYSTEM FOR TRANSFERRING A COMMUNICATION SESSION

(75) Inventors: Hemang F. Patel, Hoffman Estates, IL (US); John C. Kay, Elgin, IL (US); Matthew C. Keller, Algonquin, IL (US); James A. Marocchi, Winfield, IL (US); Trent J. Miller, West Chicago, IL (US); Marianne J. Stanke, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 311 days.

(21) Appl. No.: 12/243,210

(22) Filed: Oct. 1, 2008

(65) Prior Publication Data

US 2010/0082810 A1    Apr. 1, 2010

(51) Int. Cl.
| | |
|---|---|
| *G06F 15/173* | (2006.01) |
| *G06F 15/177* | (2006.01) |
| *H04W 36/24* | (2009.01) |
| *H04L 29/08* | (2006.01) |
| *H04W 36/14* | (2009.01) |
| *H04W 76/04* | (2009.01) |

(52) U.S. Cl.
CPC ............... *H04W 36/24* (2013.01); *H04L 67/14* (2013.01); *H04L 67/145* (2013.01); *H04L 67/148* (2013.01); *H04W 36/14* (2013.01); *H04W 76/041* (2013.01)
USPC ............................ 709/223; 709/224; 709/238

(58) Field of Classification Search
USPC .................................... 709/223–225; 714/15
See application file for complete search history.

(56) References Cited

U.S. PATENT DOCUMENTS

| | | | | |
|---|---|---|---|---|
| 5,742,762 | A | * | 4/1998 | Scholl et al. ................... 709/200 |
| 5,951,694 | A | * | 9/1999 | Choquier et al. ............... 714/15 |
| 6,058,424 | A | * | 5/2000 | Dixon et al. ................... 709/226 |
| 7,221,660 | B1 | | 5/2007 | Simonson |

(Continued)

FOREIGN PATENT DOCUMENTS

| | | |
|---|---|---|
| KR | 1020080049403 A | 6/2008 |
| WO | 2007051489 A1 | 5/2007 |

(Continued)

OTHER PUBLICATIONS

Nahrstedt, K., Xu, D., Wichadakul D., and Li, B. 2001. QoS-Aware Middleware for Ubiquitous and Heterogeneous Environments. IEEE Communications [retrieved from the Internet on May 21, 2010].*

(Continued)

*Primary Examiner* — Saleh Najjar
*Assistant Examiner* — Feliciano Mejia
(74) *Attorney, Agent, or Firm* — Steven May

(57) ABSTRACT

A method and system for transferring an ongoing communication session from one application server (AS) to another is described. Multiple ASs are monitored and serviced by a Transfer Management Module (TMM). Each of the ASs serves a different network and each network includes various end devices. During an ongoing communication session, whether the session is to continue using the current AS is determined based on a set of rules. If the session is to be transferred, an alternative AS that provides the same application as the current AS is selected using a set of conditions. Upon selection of the alternative AS, the current AS transfers the control and/or media state of the ongoing session for one to all users through the TMM to the selected AS, and the session is continued.

20 Claims, 11 Drawing Sheets

(56) References Cited

U.S. PATENT DOCUMENTS

| | | | |
|---|---|---|---|
| 7,316,020 B2 | 1/2008 | Raja et al. | |
| 7,594,018 B2 * | 9/2009 | Pedersen | 709/227 |
| 7,664,847 B2 * | 2/2010 | Colrain et al. | 709/224 |
| 7,694,011 B2 * | 4/2010 | O'Rourke et al. | 709/238 |
| 7,848,769 B2 * | 12/2010 | Fuller et al. | 455/521 |
| 7,912,075 B1 | 3/2011 | Holland et al. | |
| 8,276,197 B1 * | 9/2012 | Mangal et al. | 726/8 |
| 2002/0065915 A1 * | 5/2002 | Anderson et al. | 709/225 |
| 2004/0162901 A1 * | 8/2004 | Mangipudi et al. | 709/225 |
| 2006/0120287 A1 | 6/2006 | Foti et al. | |
| 2006/0153068 A1 * | 7/2006 | Dally et al. | 370/219 |
| 2006/0250946 A1 | 11/2006 | Croak et al. | |
| 2007/0005774 A1 * | 1/2007 | Singh et al. | 709/227 |
| 2007/0156869 A1 * | 7/2007 | Galchev et al. | 709/223 |
| 2008/0005774 A1 | 1/2008 | Okada et al. | |
| 2008/0084867 A1 | 4/2008 | Foti et al. | |
| 2008/0095079 A1 * | 4/2008 | Barkley et al. | 370/260 |
| 2008/0165764 A1 | 7/2008 | Mutikainen et al. | |
| 2008/0267385 A1 * | 10/2008 | Provost et al. | 379/225 |

FOREIGN PATENT DOCUMENTS

| | | |
|---|---|---|
| WO | WO2007056158 A3 | 5/2007 |
| WO | WO2007067109 A1 | 6/2007 |

OTHER PUBLICATIONS

Phan, T.; Xu, K.; Guy, R.; Bagrodia, R.; "Handoff of application sessions across time and space", Communications, 2001. ICC 2001. IEEE International Conference on vol. 5: 2001 , pp. 1367-1372 vol. 5 [retreved from IEEE database on May 5, 2010].*

Bellavista, P., Corradi, A., Foschini, L. "Application-Level Middleware to Proactively Manage Handoff in Wireless Internet Multimedia", Management of Multimedia Networks and Services Lecture Notes in Computer Science, 2005, vol. 3754/2005 [retreived from Sringer Link database on Sep. 30, 2012].*

Seta, N.; Miyajima, H.; Zhang, L.; Hayashi, H.; Fujii, T., "All-SIP Mobility: Session Continuity on Handover in Heterogeneous Access Environment", Vehicular Technology Conference, 2007. VTC2007-Spring. IEEE 65th; 2007 , pp. 1121-1126 [retrieved from IEEE database on Sep. 30, 2012].*

Dutta, A.; Madhani, S.; Chen, W.; Altintas, O.; Schulzrinne, H., "Fast-handoff schemes for application layer mobility management", Personal, Indoor and Mobile Radio Communications, 2004. PIMRC 2004. 15th IEEE International Symposium on vol. 3; 2004 , pp. 1527-1532 [retrieved from IEEE database].*

Felici, L., "Using WebSphere Application Server V5 for load balancing and failover," accessed at http://www.ibm.com/developerworks/library/i-wasldbal/, pp. 12.

P25 ISSI Plus IP Interoperability: Build a "Network of Networks" accessed at http://www.cisco.com/en/US/prod/collateral/ps6712/ps6718/prod_brochure0900aecd806a0cfc.pdf, pp. 4.

English Translation of Office Action for Counterpart Korean Patent Application No. 10-2011-7007477 mailed on Apr. 27, 2011.

European search Report for counterpart European Patent Application No. 09818292 dated May 14, 2012.

International Preliminary Report on Patentability for counterpart Application No. PCT/US2009/058135 mailed on Apr. 14, 2011.

PCT Search Report Dated Apr. 30, 2010.

Notice of Acceptance in counterpart Australian Patent Application No. 2009298819, mailed on Jun. 12, 2013.

Notice of Allowance in counterpart Canadian Patent Application No. 2738467, mailed on Dec. 9, 2013.

Office Action in counterpart Canadian Patent Application No. 2738467, mailed on Apr. 15, 2013.

Patent Examination Report in counterpart Australian Patent Application No. 2009298819, mailed on Jan. 23, 2013.

* cited by examiner

METHOD AND SYSTEM FOR TRANSFERRING A COMMUNICATION SESSION

TECHNICAL FIELD

The technical field relates generally to communication networks and more particularly to transfer of a communication session between different networks.

BACKGROUND

A typical communication system consists of an Application Server (AS) that serves a network containing communication links, users, and their end devices. Two or more users on a network, using the same application, begin a session. An AS keeps track of each ongoing session on its network and also maintains information about the users involved. The termination of a user's session due to poor signal quality or excessive network traffic is annoying at best and may well result in undesired application behavior, especially if the user is making an emergency call.

Public safety agencies typically employ Land Mobile Radio (LMR) systems with diverse access technologies and equipment. Public safety users of such agencies often carry more than one end device in order to communicate over different networks. The end devices may employ either analog or digital technology. The end devices may operate on different bandwidths or support disparate networks, with varying standards and protocols and so on. These differences rule out the possibility of communication between different networks, in spite of the end devices providing essentially the same service.

Commercial users and public safety users are allocated different portions of the spectrum. Public safety users get the highest priority for communication between the two types of users and, under certain emergency conditions, may preempt commercial users from their allocated spectrum. As a result of these priority protocols as well as signal strength metrics, public safety users' sessions are sometimes terminated. After termination, the only option the public safety user has is to attempt to start another session on the same network and AS. This may not always be possible if, for example, the network has exceeded its capacity or if a failure has occurred at the AS. Therefore, it is desirable to enable the transfer of a session between different networks that provide similar application capabilities. During emergencies, such as natural disasters like earthquakes and hurricanes, the ability to provide session transfer between networks becomes increasingly desirable as it is likely that a high priority user will encounter poor connectivity and increased network traffic. Session transfer may involve a change of the operating end device, network, and frequency of communication or access technology. Thus, if a user or a group of users experience poor connectivity on a network while using a certain application, it is desirable to transfer the session to another network that will provide them a substantially similar application along with a similar or better Quality of Service (QoS) and priority.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIGS. 5A and 5B illustrate a flowchart of an embodiment of a method for transferring an ongoing communication session from one AS to another, where a group of users is involved in the ongoing communication session, and a sub-group of the group involved in the ongoing communication session is being served by the first AS.

FIG. 8 illustrates an example system supporting a method for transferring an ongoing communication session from one PTT AS to another, where a group of users is involved in an ongoing communication session, and a sub-group of users involved in the ongoing communication session is being served by the first AS.

Figure 1:
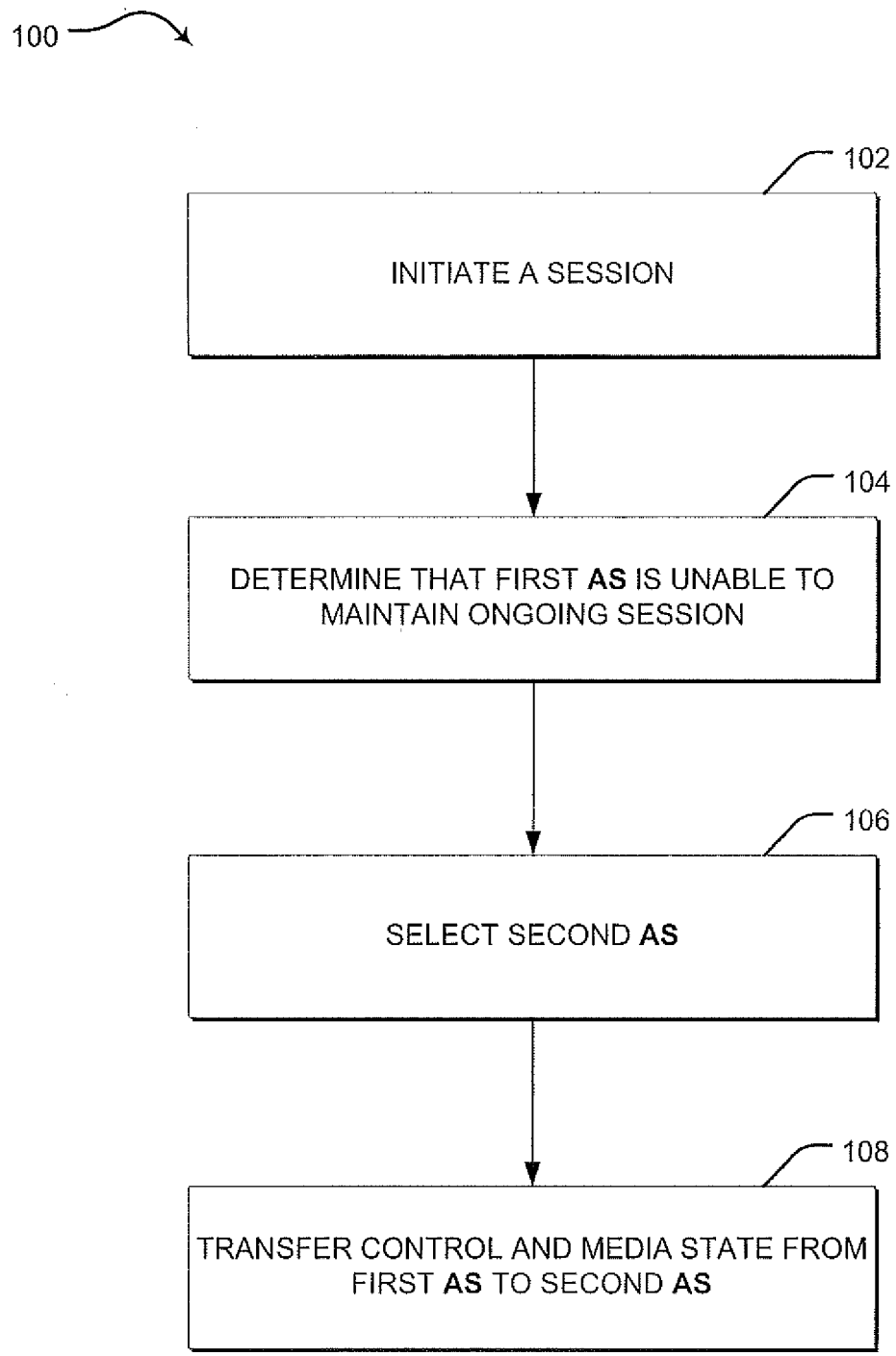
FIG. 1 is a flowchart of a method for transferring an ongoing communication session from one AS to another in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

A method described herein enables transfer of a communication session from one access network to another, creating a natural backup mechanism during degradation or loss of connectivity due to poor signal strength or high system utilization. This permits transfer when different access technologies are used while ensuring appropriate priority and QoS for users on a new network. Those skilled in the art will realize that the above-recognized advantages and other advantages described herein are merely illustrative and are not meant to be a complete rendering of all of the advantages of the various embodiments.

The following terms are used throughout this document and are defined here for clarity and convenience.

Application Server (AS): An AS is a server program that delivers applications to client end devices, and handles some, if not all, of the business logic and data access for the application. An AS is typically associated with one network using a particular access technology. It maintains information about each user in the network associated with it, including one or more of the following: information about groups of users in the network and individual users, association between a user and network, state of traffic at different times during a day, state of traffic at different locations in the coverage area of the network, system utilization, priority of each user, system availability based on criteria like connectivity loss packet loss, etc., coverage gaps and application support.

A network unless otherwise specified can include an AS network, an access network, or a device network. Each network can either be a wired or wireless network.

AS network: An AS network represents the network that provides connectivity between the AS and the end user(s). Examples of AS networks are commercial wired and wireless networks such as cellular networks, LTE broadband networks, CDMA voice networks, WiMAX broadband networks, TVWS networks, WiFi broadband networks and networks based on the P25 standard, TETRA protocol, etc.

Access network: An access network is a subset of a communication network that interfaces to the end user to enable communication with a service provider utilizing wireless technology.

Device Network: a group of devices served by the same AS.

Control and media state: Control and media state of a session includes session call control, which keeps track of whose turn it is to transmit, token management that prevents two users from accessing the same resource simultaneously, sequencing the transmission of media to users in the session, and synchronization which includes marking long transmissions that allows the users to continue from where their session was interrupted.

Priority: Priority is used to arbitrate between a number of requests from users who desire access to a system or a service. For limited network capacity, the network can grant access to users based on both user priority in the network, which is related to the service, and network priority, which is related to how the network treats a particular user's data through the network. This can include group priority.

Quality of Service (QoS): Quality of Service defines the level of treatment that a network provides to a user's transmissions, and may include parameters such as bit error rate, packet latency, service response time, packet loss, signal-to-noise ratio, echo, cross talk, etc. It may also include providing a different priority to different applications and users.

Acknowledgement: An acknowledgement is a signal passed between communicating devices or processes to indicate the occurrence of an event. This event may be receipt of a frame of information, or a lack thereof. The acknowledgements discussed herein are affirmative responses called positive acknowledgements and indicate the satisfaction of a condition.

Bandwidth: Bandwidth refers to network throughput or data rate that a link in a network or a wireless channel is capable of providing.

Connectivity loss: Connectivity loss results when an end device does not receive an acceptable QoS while communicating with another device.

Network capacity: Network capacity is the total amount of traffic (activity) that a network can service at one time. Higher capacity means that the network can service more simultaneous users and/or faster data rates.

AS network availability: AS network availability is a measure of how reliable the network is in providing connectivity at a particular time. It can be measured using various criteria like Mean Time Before Failure (MTBF), Mean Time To Repair (MTTR), average number of users affected, device hours etc.

Load balance: Load balance is a technique to spread network load among different network resources like network links, ASs, etc. in order to optimize the use of available resources and to avoid network congestion.

Time of day: Certain time slots during a day present high levels of traffic on a network. During these time slots, load balancing techniques may be utilized in order to optimize resource utilization.

Packet jitter: Packet jitter is a measure of the deviation in arrival rates between individual packets. As packets can traverse different links, such deviation is possible. Excessive packet jitter adds complexity to the packet forwarding and reproduction process, which desire to present the received information to the user as a continuous, smooth stream of information.

Packet latency: Packet latency is the difference in time between when the signal is transmitted, and when it is received. Fixed delays occur due to processing delays within the encoders and decoders or within the physical transmission systems. Variable delays arise from queues at packet processing points, such as switches and routers, in addition to transmission variables, such as the link that a particular packet or series of packets traverse within the network.

PTT: Push-To-Talk is a type of half-duplex communication over a device that allows switching between receiving and transmitting modes through the push of a button. It is especially useful in the case of a group call, where a single person can transmit to an active call group with only the push of a button. PTT generally refers to audio communication, but in some instances may include any multi-media communications.

Referring now to the drawings, and in particular FIG. 1, a flowchart of a method 100 for transferring an ongoing communication session from one AS to another, in accordance with some embodiments is illustrated. At step 102, the user initiates a communication session on an end device, using a first AS. At the next step 104, the state of the session is determined, that is, whether the ongoing communication session should or should not be continued is decided. If it is determined that the first AS is unable to maintain the ongoing communication session (or in some embodiments that a second AS is able to provide improved communication conditions), an attempt is made to transfer the ongoing communication session to a second AS that can provide improved communication conditions. The second AS may be identified prior to the beginning of the ongoing communication session or during the ongoing communication session. The selection of the second AS is made at step 106 is based on a set of conditions. It should be understood that steps 104 and 106 need not occur in the order shown in FIG. 1, and one need not be dependent on the other. The second AS serves a different network from the first AS, and it should be understood that this is applicable to all the embodiments discussed in this disclosure. Networks can differ in a variety of ways. Some criteria based on which networks can differ are use of analog technology versus digital technology, use of different bandwidths, standards, and protocols. At step 108, the method 100 proceeds to transfer control and media state of the ongoing communication session from the first AS to the second AS.

Figure 2:
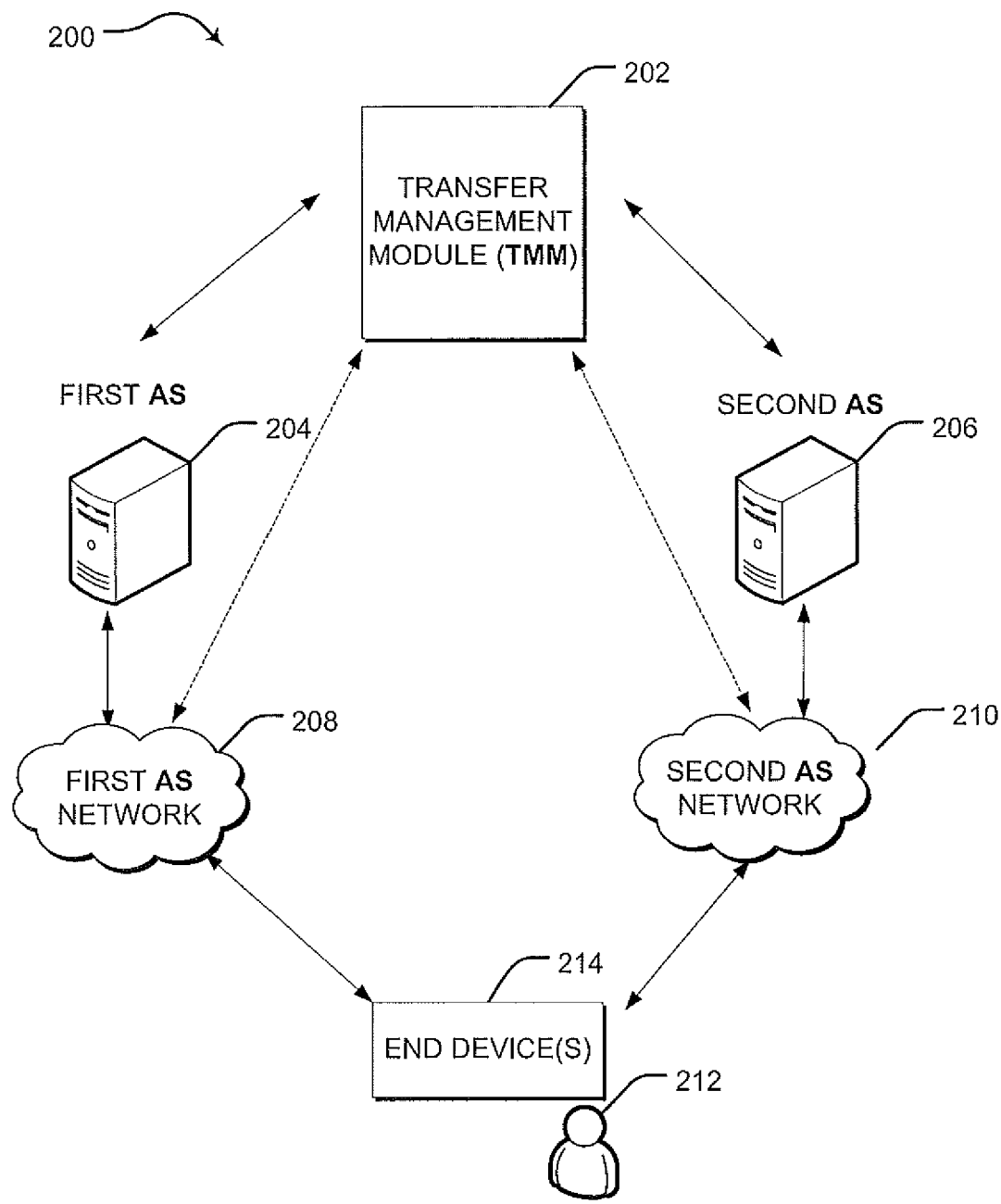
FIG. 2 illustrates an embodiment of a system supporting a method for transferring an ongoing communication session from one Push-to-Talk (PTT) AS to another, involving a user possessing one or more end devices.

FIG. 2 illustrates an embodiment of a system 200 supporting a method for transferring an ongoing communication session from one AS to another, involving a user possessing one or more end devices. A Transfer Management Module (TMM) 202 is connected to multiple networks and their corresponding ASs, specifically including a first AS 204 and a second AS 206. Additionally, the TMM 202 may communicate with the first AS network 208 and the second AS network 210 to facilitate transfer of information. The TMM 202 may be an AS, a part of an AS that serves existing networks, or an application gateway (e.g.; a SIP Gateway). In one embodiment, the TMM 202 may serve as an application gateway (i.e., translate control and media) between the first AS 204 and second AS 206. The first AS 204 serves a first AS network 208, while the second AS 206 supports a second AS network 210. A user 212 possesses one or more end devices 214. Each end device 214 communicates either through one or both of the first AS network 208 and the second AS network 210. Different embodiments of the method being supported by the system 200 are discussed in connection with FIGS. 3A and 3B, FIGS. 4A and 4B and FIGS. 5A and 5B.

Figure 3A:
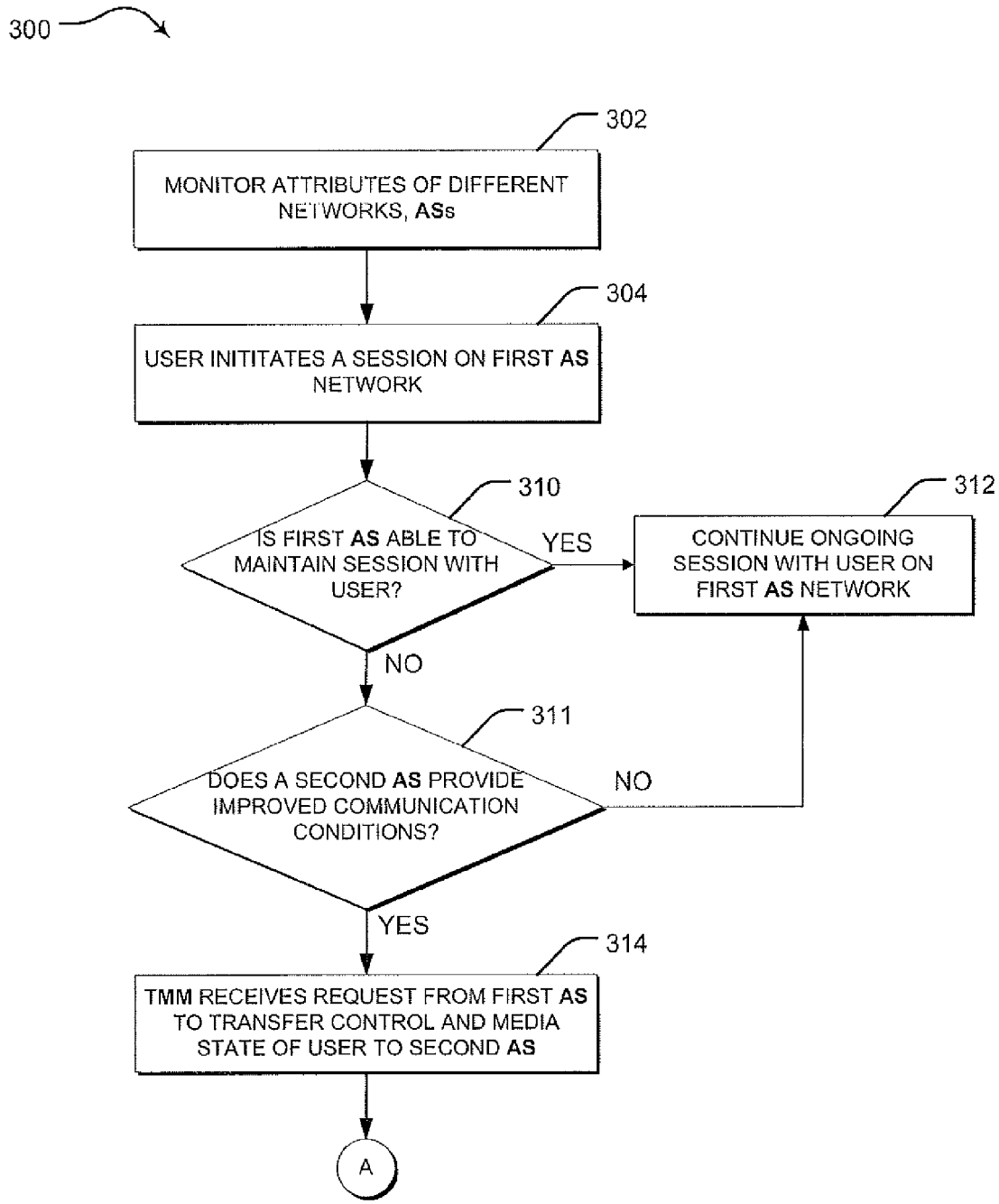
FIGS. 3A and 3B illustrate a flowchart for an embodiment of a method for transferring an ongoing communication session from one AS to another through a 'basic' TMM.
Figure 3B:
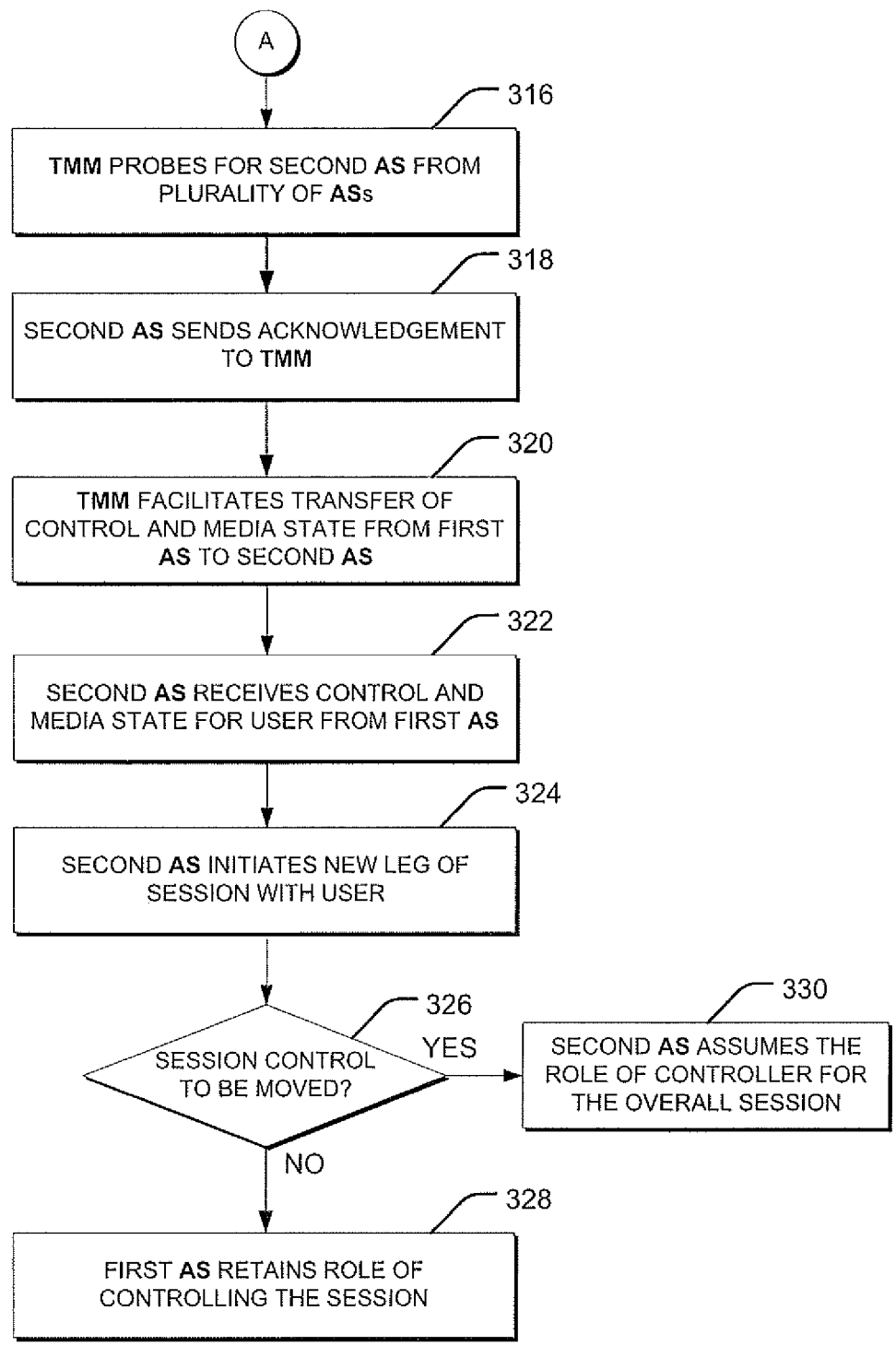

Turning now to FIGS. 3A and 3B, a flowchart of an embodiment of a method 300 for transferring an ongoing communication session from one AS to another through a 'basic' TMM is described. This embodiment involves a user possessing multiple end devices, at least two end devices communicating over different networks. The TMM 202 is connected to multiple networks and their corresponding ASs, and it monitors various attributes of the multiple networks (step 302) including the QoS provided by each AS network, the capacity availability of each AS network, the users served by each AS, the networks capable of being accessed by one or more end devices, the applications provided by each AS, user role (e.g., Chief of Police, Incident Commander, Responding Officer, detective), and the priority capabilities of each AS network. These attributes may be supplied by each AS network directly (208, 210) to the TMM or via the AS for each network. At step 304, the user 212 initiates a session for an application on the first AS network 208, using a first end device that supports the first AS network 208.

Step 310 and step 311 illustrate the first AS 204 determining whether or not the ongoing communication session should continue or whether it is desirable for the ongoing communication session to continue on an alternative AS. If the first AS 204 determines that the ongoing communication session should continue, the first AS 204 continues to service the user 212 at step 312. If the first AS 204 is unable to maintain the session (as decided at step 310), or an alternative AS is able to provide improved communication conditions (as decided at step 311), the first AS 204 determines that the session is to be transferred. The first AS network 208 may be unable to maintain the session if, for example, unacceptable packet loss, packet jitter, packet latency, connectivity loss with the end device, high system utilization, or an exceptional event occurs. Communication conditions include, for example, availability of the alternative AS network, signal strength to the user or group of users on the alternative AS network, uneven load balance between the first AS network 208 and alternative AS networks, preferred AS network selection based on time of day, or the QoS provided by the alternative AS network. If the first AS 204 determines that the session should not continue on the first AS 204, transfer of the session to an alternative AS that can provide improved communication conditions is attempted.

At step 314, the TMM 202 receives a request from the first AS 204 to transfer control and media state of the user to an alternative AS. In response, the TMM 202 probes a number of ASs at step 316 to find a suitable alternative AS that can serve the user 212 and satisfy a set of conditions. For this purpose, it may be useful to provide TMM 202 with the capability to recognize the various devices available to end users such as user 212. In a 'basic' TMM, the capabilities beyond the network management tasks set out elsewhere in this disclosure will be sufficient, but where, as here, the ability to deal with a number of different end user devices may be advantages. In this situation, an 'enhanced' TMM can be provided, as described in relation with FIGS. 4A and 4B. Such a TMM offers functionality that recognizes and tracks end user devices employed by specific users, including information such as the number of end user devices, their type, the functions performable by that type unit, quality of service and network characteristics. The 'enhanced' TMM may additionally have the ability to maintain information about which ASs could serve as alternatives to the first AS 204 in the event that the ongoing session should not be continued on the first AS 204. Given this functional description, those of skill in the art can implement such a device.

The set of conditions underlying the identification of a suitable alternative AS can include factors such as whether the alternative AS can provide an application substantially similar to the application being used on the first AS network 208 by the user 212, or whether the alternative AS can interoperate with the first AS 204 at the application level. Here, substantially similar applications are applications capable of performing the same function and may be used interchangeably, albeit with the use of one or more of different protocols, standards, and technology. Some examples include APCO P25 and OMA PoC PTT technologies. The alternative AS being communicably reachable by one or more end devices possessed by the user 212, or providing an appropriate priority or QoS for the user 212 can also be included in the set of conditions. If the set of conditions is met by the alternative AS, the alternative AS sends an acknowledgement to the TMM 202 at step 318. Here, the second AS 206 is presumed to satisfy the set of conditions and has provided such an acknowledgement. In response to the acknowledgement, the TMM 202 facilitates the transfer of the ongoing communication session from the first AS 204 to the second AS 206 by providing the first AS 204 with the identity and perhaps other information of the second AS 206.

The first AS 204 transfers the control and media state of the ongoing communication session to the second AS 206 through the TMM 202 as shown in step 320. During this step, the TMM 202 attempts to transfer equivalent priority for the user 212 from the first AS 204 to the second AS 206. For instance, if a commercial user making an emergency call on the D block band is transferred to a network using the public safety band, the user should retain the emergency status e.g., on their private P25 system (using a P25 based PTT device). In a further embodiment, the TMM 202 translates QoS methodologies in order to achieve the transfer of equivalent priority. Here, the TMM 202 ensures that the QoS provided to the user 212 on the second AS 206 is at least equivalent or better than the QoS provided to the user 212 on the first AS 204. The advantage of the TMM 202 facilitating this transfer is that it provides high security and avoids traversing the full mesh of ASs during the transfer (the first AS 204 and the second AS 206 may not be directly connected to each other, and the transferred information may have to travel through multiple links and ASs in order to reach the second AS 206 from the first AS 204). The second AS 206 receives the control and media state of the ongoing communication session of the user 212 from the first AS 204, as shown at step 322. At step 324, the second AS 206 initiates a new leg of the session with the user 212. At step 326, the decision of whether or not session control should be moved is taken. If the session control is not moved, then the first AS 204 remains the session controller AS of the ongoing session, as shown in step 328. The session controller AS is the AS controlling the ongoing communication session between all users involved. It maintains information related to the ongoing communication session and the users, in addition to knowing which user is being served by which AS. If the session control is moved, the second AS assumes the role of controller for the ongoing session, at step 330.

Figure 4A:
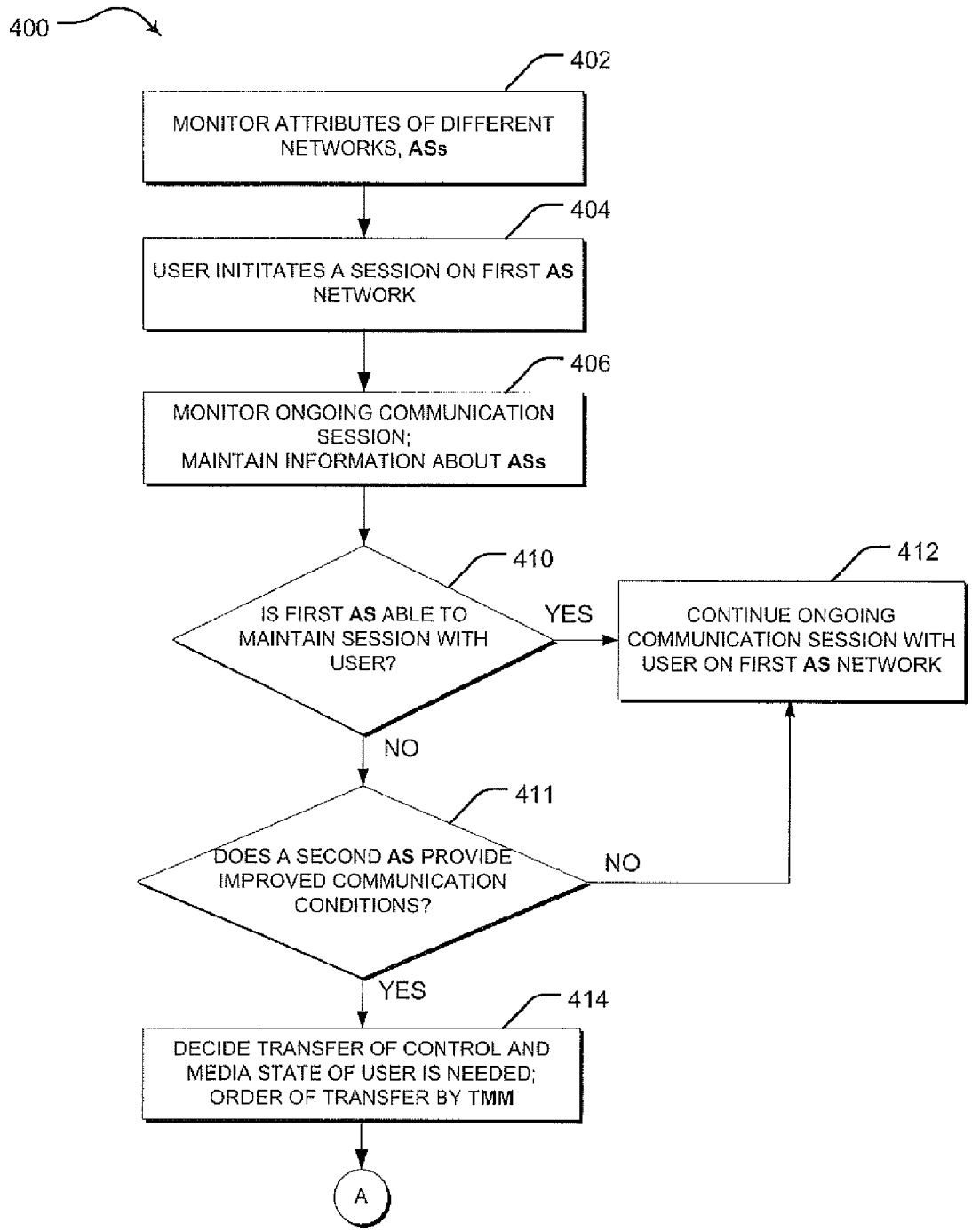
FIGS. 4A and 4B illustrate a flowchart of an embodiment of a method for transferring an ongoing communication session from one AS to another through an 'enhanced' TMM.
Figure 4B:
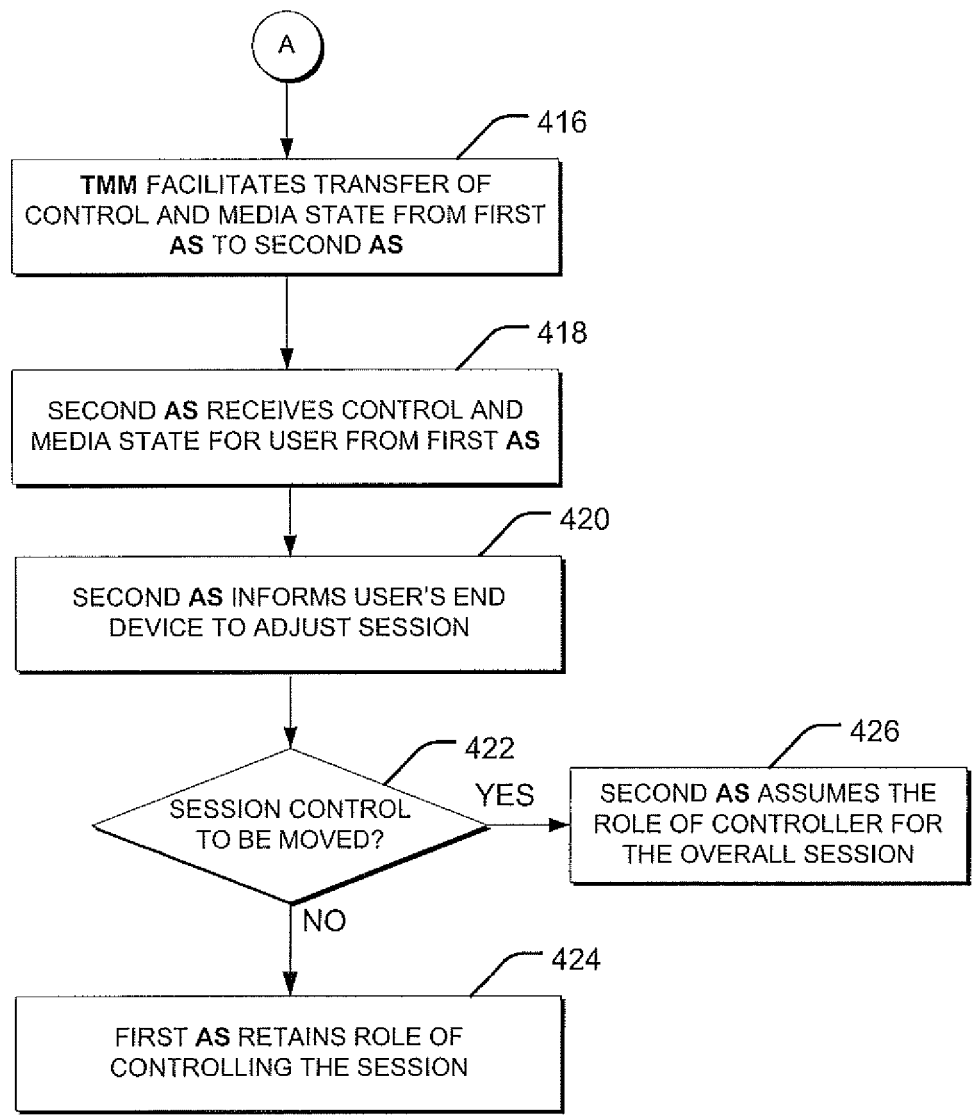

FIGS. 4A and 4B illustrate a flowchart of an embodiment of a method 400 for transferring an ongoing communication session from one AS to another through an 'enhanced' TMM. This embodiment addresses the situation in which the user 212 possesses a dual-mode end device 214, such as a cellular phone or a Personal Digital Assistant (PDA). The dual-mode end device 214 supports two different networks, such as an LMR access network and a broadband wireless IP network. The TMM 202 is connected to two networks and their corresponding ASs, and it monitors one or more attributes of the multiple networks (step 402) including the QoS provided by each AS network, the capacity availability of each AS network, the users served by each AS, the networks capable of being accessed by one or more end devices, the applications provided by each AS, user role, and the priority capabilities of each AS network. These attributes may be supplied by each AS network directly (208, 210) to the TMM or via the AS for each network. Additionally, the TMM 202 monitors ongoing communication sessions, and for each ongoing communication session, it keeps track of which networks are supported by each user's end devices. In a further embodiment, the TMM 202 implements application heartbeat or continuity checks for the end devices being used in the ongoing communication session.

At step 404, the user 212 initiates a session for an application on the first AS network 208, using the dual-mode end device 214. At the next step 406, the TMM 202 learns of the initiated session and monitors the users involved in the initiated session. The TMM 202 identifies one or more ASs that satisfies a set of conditions and will, as a result, be able to serve as an alternative AS for the user 212. The set of conditions can include factors such as the alternative AS providing an application substantially similar to the application being used on the first AS network 208 by the user 212 and being able to interoperate with the first AS 204 at the application level. The alternative AS being communicably reachable by one or more end devices possessed by the user 212, or providing an appropriate priority or QoS for the user 212 can also be included in the set of conditions.

It will be readily understood by a person skilled in the art that the enhanced TMM monitoring and checks described here are not restricted in their use to users with dual-mode end devices only; these steps can just as easily be incorporated into a method involving a user possessing multiple single-mode end devices. Similarly, the basic level TMM monitoring described in connection with FIGS. 3A and 3B may be employed in a method involving a user possessing a dual-mode end device. As a consequence to the basic level TMM monitoring, on learning that the session should not be continued on the first AS 204, the TMM 202 will need to carry out the probing step (step 316) in order to identify a suitable alternative AS.

Step 410 and step 411 illustrate the first AS 204 determining whether or not the ongoing communication session should continue or whether it is desirable for the ongoing communication session to continue on an alternative AS. If the first AS 204 determines that the ongoing communication session should continue, the first AS 204 continues to service the user 212 at step 412. If the first AS 204 is unable to maintain the ongoing communication session (as decided at step 410), or an alternative AS is able to provide improved communication conditions (as decided at step 411), the first AS 204 determines that the ongoing communication session is to be transferred. In this example, it is presumed that the TMM 202 identifies the second AS 206 as one of the one or more ASs. The first AS network 208 will be unable to maintain the ongoing communication session if it encounters unacceptable packet loss, packet jitter, or packet latency, connectivity loss with the end device, high system utilization, or occurrence of an exceptional event. Communication conditions on an alternative AS include availability of the alternative AS network, signal strength on the alternative AS network, uneven load balance between the first AS network 208 and alternative AS networks preferred AS network selection based on time of day, or the QoS provided by the alternative AS network. If the first AS 204 determines that the ongoing communication session is to be transferred, an attempt to transfer the ongoing communication session to an alternative AS that can provide improved communication conditions is made. In another embodiment, the TMM 202 determines whether or not the ongoing communication session can continue by conducting heartbeat or continuity checks on the first AS network 208. In a further embodiment, the ability to make this determination is distributed between the TMM 202 and the first AS 204.

The determination is based on whether the first AS 204 should maintain the ongoing communication session or whether an alternative AS is able to provide improved communication conditions, as mentioned above. In either case, the TMM 202 learns that the user 212 is not reachable through the first AS network 208, either through monitoring the first AS 204 or by making the determination itself. At step 414, the TMM 202 decides that the transfer of the ongoing communication session is desirable and facilitates transfer of the control and media state of the ongoing communication session of the user 212 from the first AS 204 to the second AS 206. In another embodiment, the first AS 204 determines that the transfer of the ongoing communication session is desirable and sends a request to the TMM 202 to transfer control and media state of the ongoing communication session of the user 212 to an alternative AS.

A person skilled in the art will understand that such advanced functionality of the TMM 202, including performing the determining and deciding steps, is not restricted to the case where the user 212 possesses a dual-mode end device, and a TMM with such functionality may be employed in a method involving users possessing multiple single mode end devices as well.

The first AS 204 transfers the control and media state of the ongoing communication session of the user 212 to the second AS 206 through the TMM 202, as shown at step 416. During this step, the TMM 202 attempts to transfer equivalent priority for the user 212 from the first AS 204 to the second AS 206. In a further embodiment, the TMM 202 translates QoS methodologies in order to achieve the transfer of equivalent priority. Here, the TMM 202 ensures that the QoS provided to the user 212 on the second AS 206 is at least equivalent or better than the QoS provided to the user 212 on the first AS 204. The advantage of the TMM 202 facilitating this transfer is that it provides high security and also avoids traversing the full mesh of ASs during the transfer (the first AS 204 and the second AS 206 may not be directly connected to each other, and the transferred information may have to travel through multiple links and ASs in order to reach the second AS 206 from the first AS 204). The second AS 206 receives the control and media state of the ongoing communication session of the user 212, in step 418, from the TMM 202. At step 420, the second AS 206 informs the dual-mode end device 214 possessed by the user 212 to adjust the ongoing communication session information for allowing the use of the second AS 206. At step 422, the decision of whether or not session control should be moved is taken. If the session control is not moved, the first AS 204 remains the session controller AS of the ongoing session. At this point, the ongoing communication session of the user 212 with the first AS 204 will end, and another communication session will begin with the second AS 206 within a short time period (for example a few seconds), on the dual-mode end device 214 possessed by the user 212. If the session control is moved, the second AS 206 assumes the role of the session controller AS for the ongoing session. In further embodiments, the user 212 shown in FIG. 2, FIGS. 3A and 3B, and FIGS. 4A and 4B is replaced by a group of users involved in the ongoing communication session. In that case, the control and media state of the entire ongoing communication session (inclusive of all the users involved in the ongoing communication session) are transferred to the second AS 206. In another embodiment, the control and media state of only the users involved in the ongoing communication session and that are served by the first AS 204, are transferred to the second AS 206. Each user may possess either multiple single-mode end devices operating on different networks or a dual-mode end device operating on the different networks.

Figure 5A:
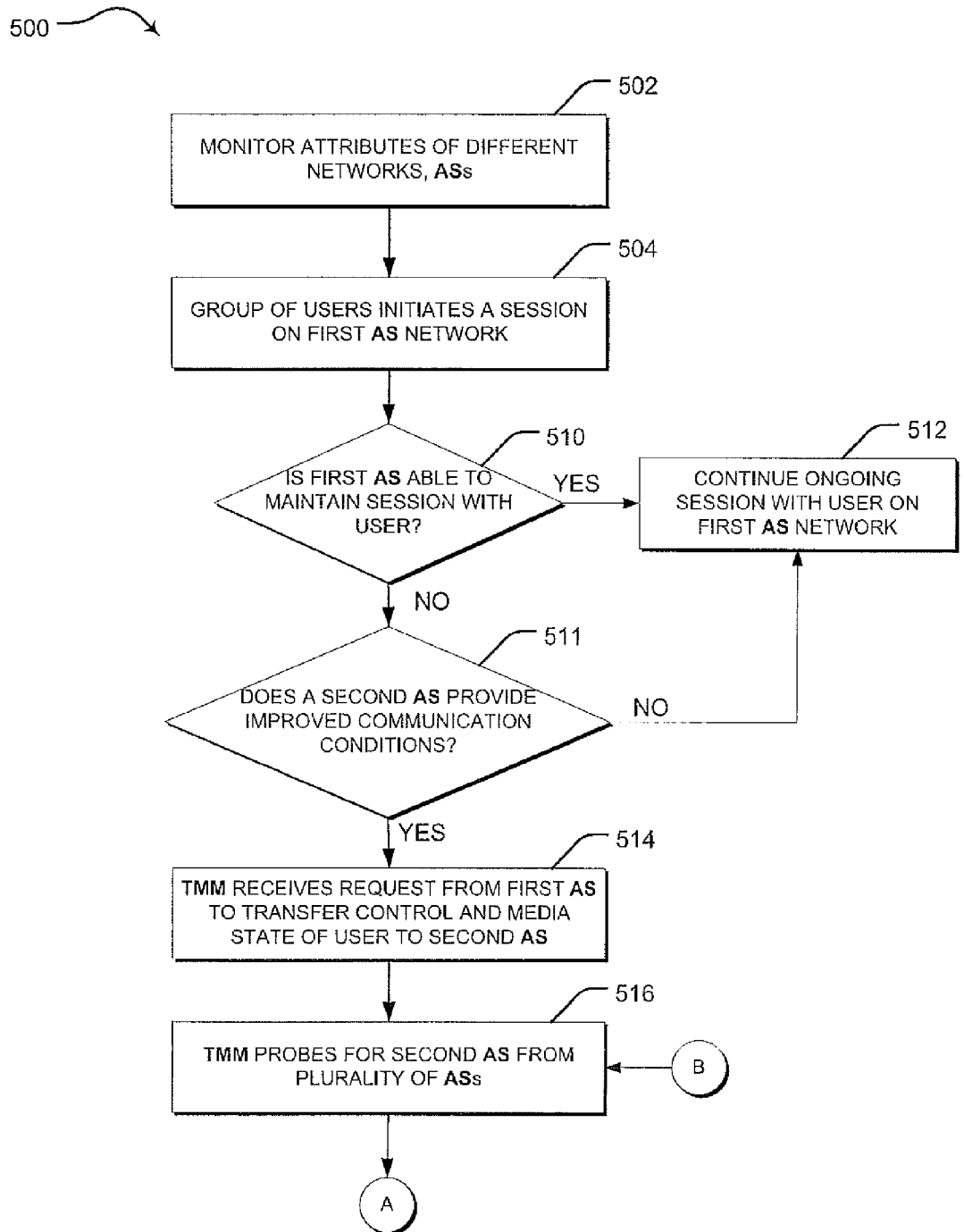
Figure 5B:
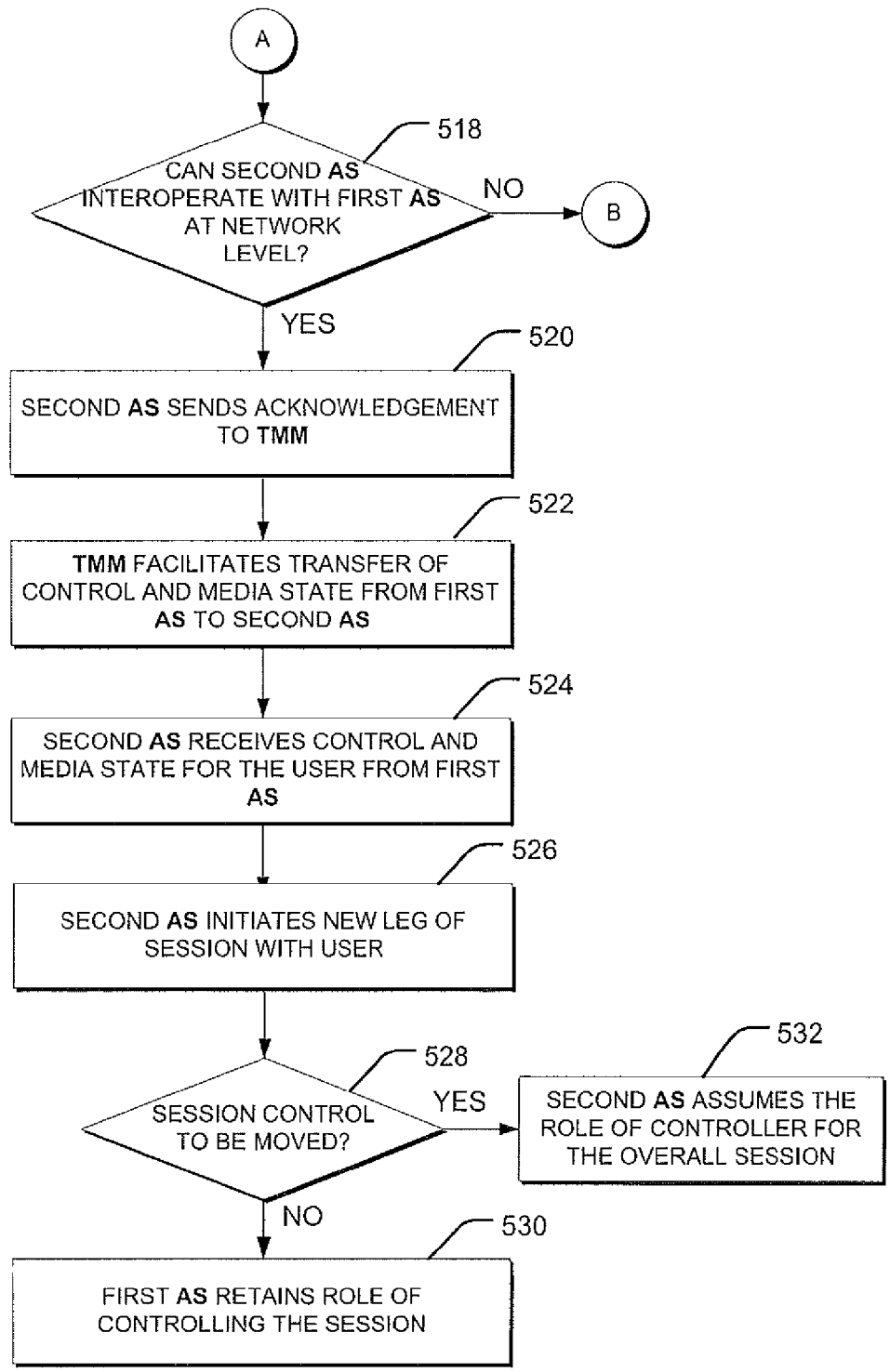

FIGS. 5A and 5B illustrate a flowchart of an embodiment of a method 500 for transferring an ongoing communication session from one AS to another, where a group of users is involved in the ongoing communication session, and a sub-group of the group involved in the ongoing communication session is being served by the first AS 204. All steps in the embodiment described here are identical to the steps in the embodiment described in connection with FIGS. 3A and 3B, except a few steps, which will be elaborated here. In this embodiment, if it is determined that a particular user from the sub-group of users should not continue to be served by the first AS 204, only the particular user's session is transferred to the second AS 206. In an alternate embodiment, it is determined that a plurality of users from the sub-group of users should not continue to be served by the first AS 204. The session for the plurality of users will then be transferred to the second AS 206. It should be noted that in addition to probing step 516 in FIG. 5A, which is similar to the step 316 in FIG. 3A, the alternative AS should have the ability to interoperate with the first AS 204 at the network level, as in this case, users involved in the ongoing communication session are being served by both the first AS 204 and the second AS 206. Once the control and media state of the ongoing communication for the user 212 has been transferred, the user 212 is able to continue communicating with all the users involved in the ongoing communication session directly in the control and media plane. The methods used by the TMM 202 to obtain network characteristics are known by one of skill in the art and thus will not be described herein.

At step 528, it may be decided that the session control will not be moved since, for example, only one user's session is being transferred to the second AS 206. The first AS 204 will remain the session controller AS of the ongoing session. At this point, the user(s) being transferred will undergo the transition based on the type of device(s) they are carrying. On the other hand, if it is decided that the session control is to be moved, the second AS 206 assumes the role of the session controller AS for the ongoing session.

It will be readily understood by a person skilled in the art that, as above, the users involved in the ongoing communication session may carry either or both multiple single mode end devices or dual-mode end devices. The enhanced TMM monitoring and checks described at step 402 in connection with FIG. 4A may be employed in the method 500 described by FIGS. 5A and 5B, as is the case with the basic level TMM monitoring described at step 302 in connection with FIG. 3A, irrespective of the nature of the end devices carried by the users. It should also be noted that the advanced functionality of the TMM 202 described in connection with FIGS. 4A and 4B may also be incorporated into the method 500 described by FIGS. 5A and 5B.

In one embodiment, the TMM 202 maintains a database of one or more of the following: overlap between coverage areas of different networks, a shared QoS maintained by the TMM 202 for the networks it serves, various attributes of all ASs, and a list of devices that can operate with each AS.

Figure 6:
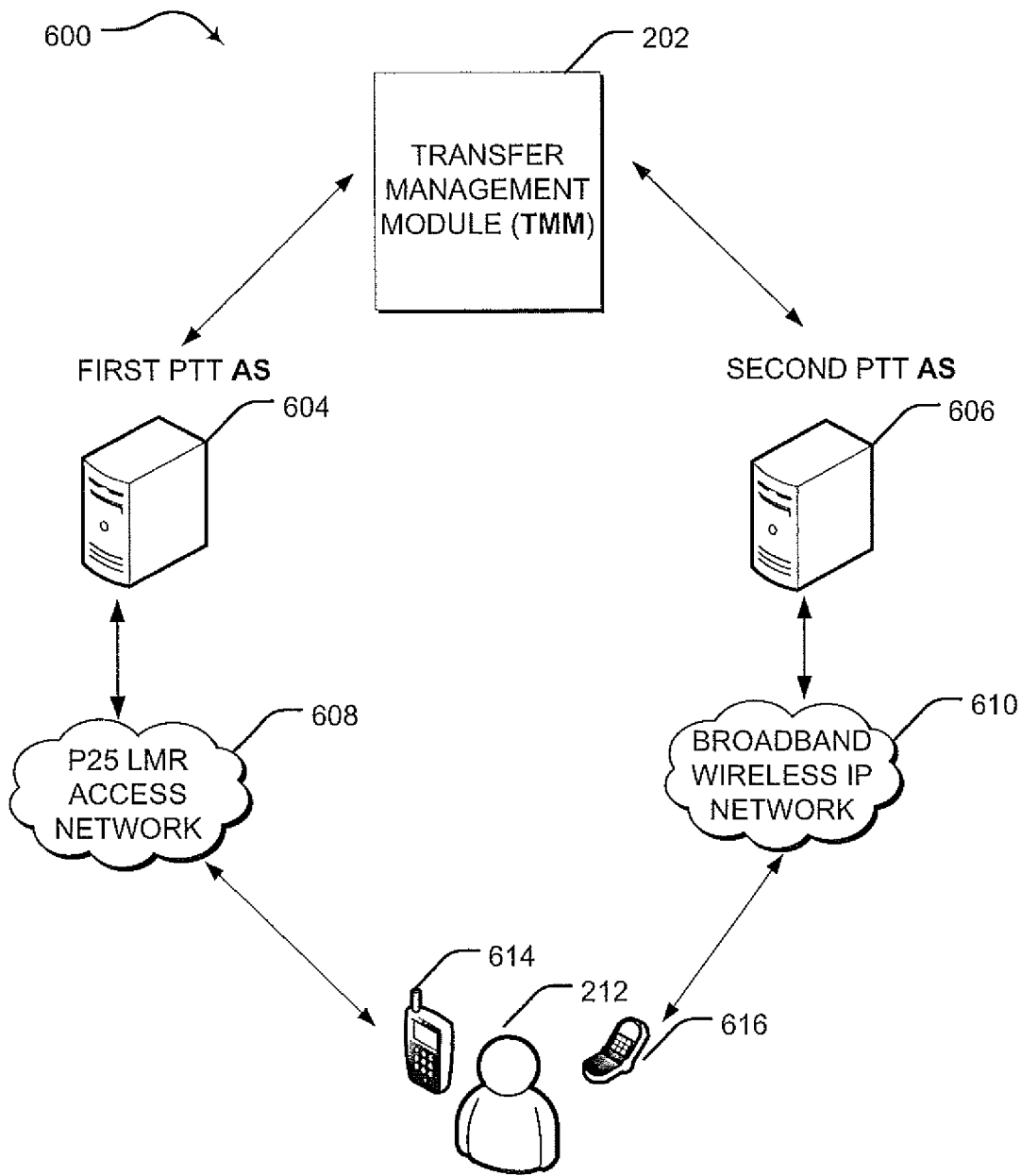
FIG. 6 illustrates an example system supporting a method for transferring an ongoing communication session from one PTT AS to another, involving a user possessing two end devices.

FIG. 6 illustrates an example system 600 supporting the method 300 for transferring an ongoing communication session from one PTT AS to another, involving a user possessing two end devices. It should be noted that the PTT ASs likely have different network protocols, for example, P25 Inter-Zone, Multi-System Inter-Zone, OMA PoC, ISSI etc., all of which are well known in the art.

Those skilled in the art, however, will recognize and appreciate that the specifics of this example are merely illustrative of some embodiments and that the teachings set forth herein are applicable in a variety of alternative settings. For example, as the teachings described do not depend on the access technology used in a network, the application being used during the ongoing communication session, or on the type of end devices used, they can be applied to any type of communication network, where the end devices may be PDAs, notebook computers, personal computers or mobile radios, although PTT servers serving networks with users possessing portable LMR devices or cellular phones are shown in some of the following embodiments (described in connection with FIG. 6, FIG. 7 and FIG. 8). As such, other alternative implementations incorporating the use of different types of networks having disparate access technologies, standards and protocols, and end devices are contemplated, and are within the scope of the various teachings described.

In FIG. 6, the TMM 202 is connected to multiple networks and their corresponding ASs, specifically including a first PTT AS 604 and a second PTT AS 606. The first PTT AS 604 serves a LMR access network 608, while the second PTT AS 606 supports a broadband wireless IP network 610. The LMR access network can be implemented based on P25 or any of the protocols known in the art, as discussed above. The user 212 possesses two end devices, the first end device being a portable LMR device 614, supporting the LMR access network 608, while the second end device is a cellular phone 616 with PTT capability that supports the broadband wireless IP network 610.

Figure 7:
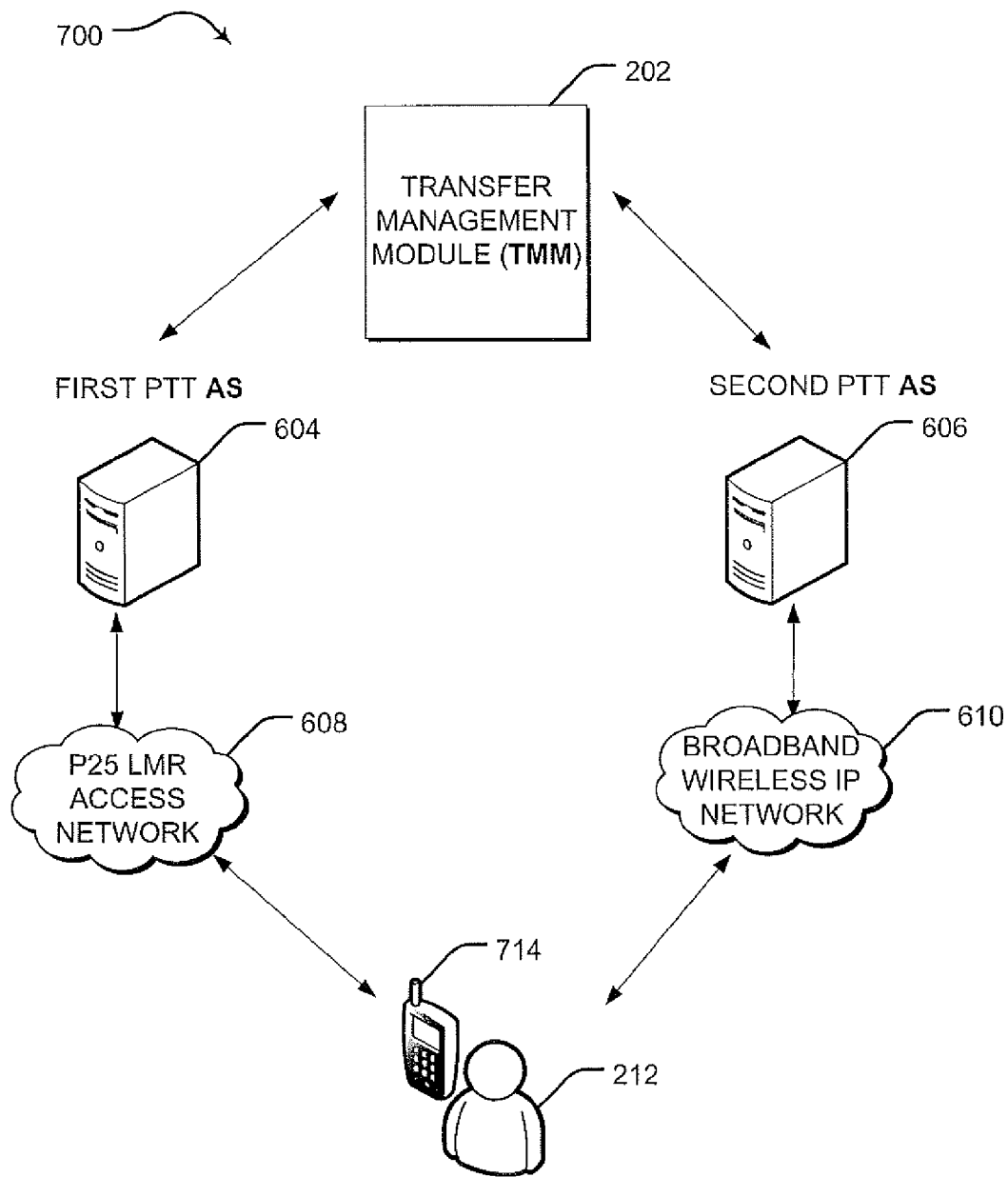
FIG. 7 illustrates an example system supporting a method for transferring an ongoing communication session from one PTT AS to another, involving a user possessing a dual-mode end device, the end device supporting two different networks.

FIG. 7 illustrates an example system 700 supporting the method 400 of transferring an ongoing communication session from one PTT AS to another, involving a user possessing a dual-mode end device, the end device supporting two networks. The TMM 202 is connected to multiple networks and their corresponding ASs, specifically including the first PTT AS 604 and the second PTT AS 606. The first PTT AS 604 serves the LMR access network 608, while the second PTT AS 606 supports the broadband wireless IP network 610. The LMR access network can be implemented based on P25 or any of the protocols known in the art, as discussed above. The user 212 possesses a dual-mode end device 714, supporting both the LMR access network 608 and the broadband wireless IP network 610.

Figure 8:
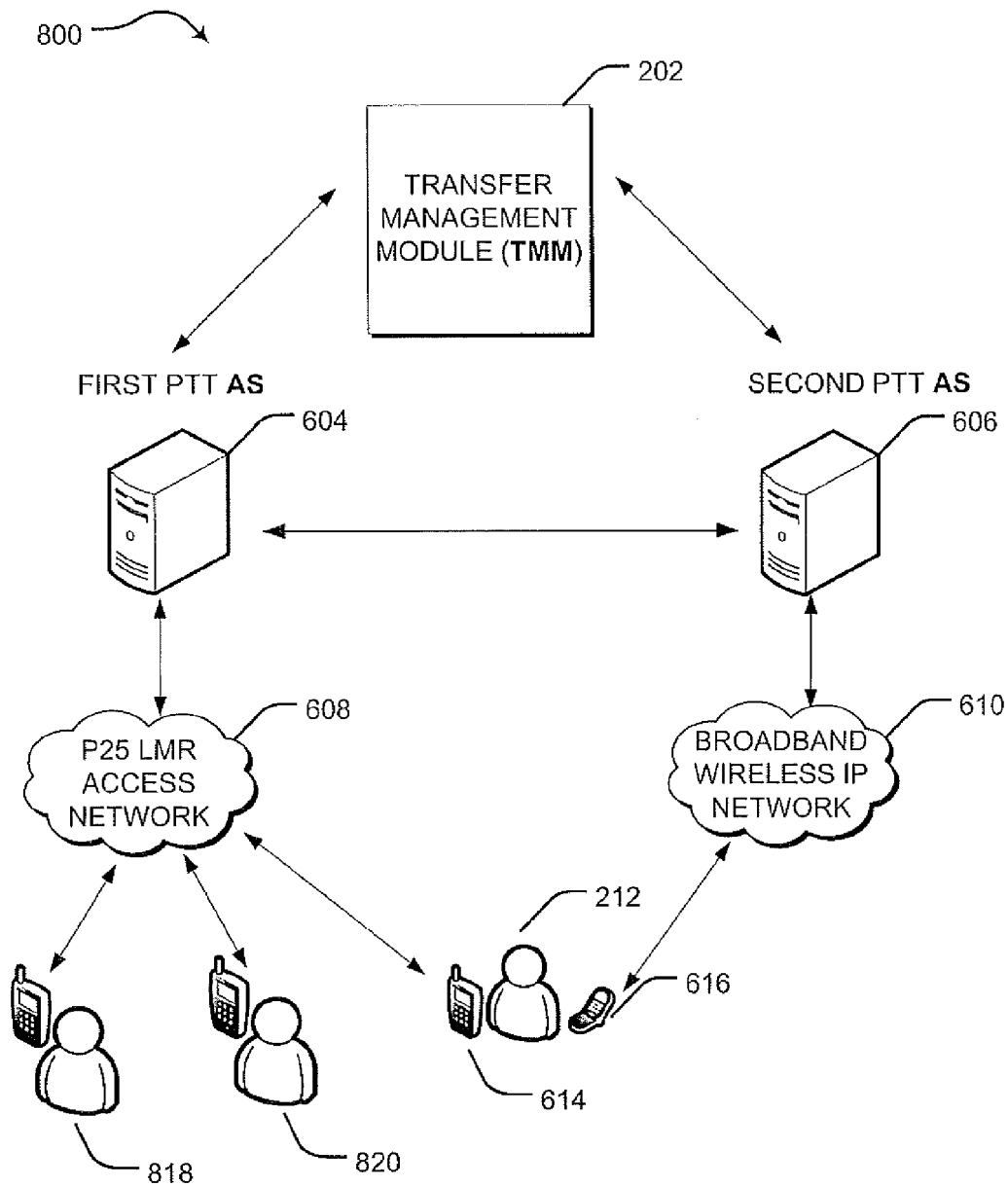

FIG. 8 shows an example system 800 supporting the method 500 for transferring an ongoing communication session from one PTT AS to another, where a group of users is involved in an ongoing communication session, and a subgroup of users involved in the ongoing communication session is being served by the first PTT AS 604. In this embodiment, if it is determined that a particular user from the subgroup of users should not continue to be served by the first PTT AS 604, only the particular user's session will be transferred to an alternative AS.

The TMM 202 is connected to multiple networks and their corresponding ASs, specifically including the first PTT AS 604 and the second PTT AS 606. The first PTT AS 604 serves the LMR access network 608, while the second PTT AS 606 supports the broadband wireless IP network 610. The LMR access network can be implemented based on P25 or any of the protocols known in the art, as discussed above. The user 212 possesses two end devices, the first end device being the portable LMR device 614, supporting the LMR access network 608, while the second end device is the cellular phone 616 with PTT capability that supports the broadband wireless IP network 610. In this example, the user 212 and users 818 and 820 are presumed to be involved in an ongoing communication session on the LMR access network 608 and are being served by the first PTT AS 604, which is also the session controller AS for the ongoing communication session. The users 818 and 820 will continue being served by the first PTT AS 604, while the ongoing communication session of the user 212 will be transferred to the second PTT AS 606.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. In addition, although various embodiments are described in detail, elements of such embodiments may be combined to form alternate embodiments.

The Abstract of the Disclosure is provided to allow a reader to quickly ascertain the nature of the technical disclosure. It is submitted with the understanding that it will not be used to interpret or limit the scope or meaning of the claims.

What is claimed is:

1. A method for transferring a communication session, the method comprising:
    providing a plurality of Application Servers (AS), including a first AS using a first AS application protocol and a second AS using a second AS application protocol, the first AS serving a user involved in an ongoing communication session involving one or more other users using the first AS application protocol, wherein the user is communicating on an end device, and wherein the first AS application protocol is different from the second AS application protocol;
    providing a Transfer Management Module (TMM) in communication with the plurality of ASs at the application level;
    determining, based on a set of rules, that either the first AS is unable to maintain the ongoing communication session with the user or the second AS is able to provide improved communications conditions compared with the first AS;
    selecting, by the TMM, the second AS from the plurality of ASs based on a set of conditions including at least one of an incident, priority, or role of the user; and
    facilitating, by the TMM, transfer of control and media state of communication with the user from the first AS to the second AS upon the determination that the first AS is unable to maintain the ongoing communication session with the user or the second AS is able to provide improved communications conditions compared with the first AS.

2. The method of claim 1, wherein user access to the first AS and the second AS is provided by different access technologies.

3. The method of claim 1, wherein the AS selecting step is further based on the second AS being able to interoperate with the first AS at the application level.

4. The method of claim 1, wherein the set of conditions further include one or more of:
    the second AS providing a substantially similar application as the application being used on the first AS network by the user;
    the second AS being communicably reachable by one or more devices of the user;
    a predetermined priority being available on the second AS network for the user;
    a predetermined Quality of Service existing on the second AS network for the user, and
    a criterion including a location of the user.

5. The method of claim 1, wherein the determining step is performed by the TMM.

6. The method of claim 1, further including the TMM receiving a request from the first AS for an alternative AS.

7. The method of claim 1, further including the second AS sending an acknowledgment to the TMM conveying satisfaction of the conditions by the second AS.

8. The method of claim 1, further including the TMM maintaining a predetermined Quality of Service by at least monitoring the Quality of Service provided by the first AS network, and of the second AS network, and determining that the Quality of Service that can be provided by the second AS network is substantially equivalent to or better than the Quality of Service that is provided by the first AS network.

9. The method of claim 1, wherein the TMM monitors one or more network attributes that include one or more of:
   network Quality of Service for communication to the end device;
   available network capacity of each AS network;
   available capacity of each AS;
   users and devices served by each AS;
   networks being accessed by one or more end devices carried by the user;
   communicability between each end device and each AS;
   communicability between the first AS and the second AS;
   communicability between the first and second ASs and the TMM;
   user role;
   user priority;
   user location;
   applications provided by each AS; or
   priority capabilities of each AS network.

10. The method of claim 1, wherein the set of rules includes one or more of:
    a predetermined Quality of Service on the first AS network,
    a predetermined bandwidth availability,
    connectivity loss with the end device on the first AS network,
    availability of the second AS network,
    a stronger wireless signal on the second AS network,
    greater capacity in a network in which the second AS operates than a network in which the first AS operates,
    high system utilization on the first AS network,
    preferred AS network selection based on time of day,
    the Quality of Service provided by the second AS network, or
    occurrence of an exceptional event at the first AS network.

11. The method of claim 1, wherein the ongoing communication session involves multiple other users and the step of providing the plurality of ASs further includes providing one or more ASs serving the other users involved in the ongoing communication session, and wherein one of the one or more ASs is a session controller AS.

12. The method of claim 1 wherein the first AS serves a plurality of users that are involved in the ongoing communication session, and the step of facilitating comprises facilitating transfer of control and media state of communication to fewer than all of the plurality of users, to the second AS.

13. The method of claim 1 wherein the step of facilitating comprises facilitating transfer of overall session control of all users involved in the ongoing communication session to the second AS.

14. The method of claim 13 wherein the first AS serves a plurality of users that are involved in the ongoing communication session, and the step of facilitating further comprises facilitating transfer of control and media state of communication to only users served by the first AS and whose ongoing communication session with the first AS is determined to be unable to be maintained to the second AS.

15. The method of claim 1 further comprising the TMM determining which ASs are involved in start up or transfer of the ongoing communication session, each AS keeping track of devices it serves and being capable of initiating a transfer of a communication session to the devices it serves.

16. The method of claim 1, wherein user access to the first AS and the second AS is provided by the same access technology.

17. The method of claim 1, wherein the determining step is performed by the first AS.

18. The method of claim 1 wherein the first AS serves a plurality of users that are involved in the ongoing communication session, and the step of transferring comprises transferring the control and media state of communication to only users served by the first AS and whose ongoing communication session with the first AS is determined to be unable to be maintained to the second AS without transferring overall session control of all users involved in the ongoing communication session to the second AS.

19. The method of claim 1 wherein the first AS serves a plurality of users that are involved in the ongoing communication session, and the step of transferring further comprises transferring the control and media state of communication to all users served by the first AS and involved in the ongoing communication session and not to users involved in the ongoing communication session and served by one or more ASs other than the second AS.

20. A system for transferring an ongoing communication session, the system comprising:
   a plurality of Application Servers (AS), including a first AS using a first AS application protocol and a second AS using a second AS application protocol, the first AS serving a user involved in the ongoing communication session involving one or more other users, wherein the first AS application protocol is different from the second AS application protocol; and
   a Transfer Management Module (TMM) in communication with the plurality of ASs at the application level and that performs:
      monitors one or more network attributes that include Quality of Service of each AS network, capacity availability of each AS network, users served by each AS, networks being accessed by one or more end devices carried by the user, applications provided by each AS, or priority capabilities of each AS network,
      determines that the first AS is unable to maintain the ongoing communication session with the user,
      receives a request from the first AS to transfer control and media state of the user to a different AS,
      selects the second AS from the plurality of ASs based a set of conditions including at least one of an incident, priority, or role of the user, wherein the second AS is capable of providing a substantially similar application as the application being used on the first AS network by the user; and
      facilitates the transfer of control and media state of the user to the second AS.

* * * * *

UNITED STATES PATENT AND TRADEMARK OFFICE
CERTIFICATE OF CORRECTION

PATENT NO.        : 8,943,182 B2
APPLICATION NO.   : 12/243210
DATED             : January 27, 2015
INVENTOR(S)       : Hemang F. Patel et al.

It is certified that error appears in the above-identified patent and that said Letters Patent is hereby corrected as shown below:

IN THE TITLE PAGE:

On Page 2, Item (56), under "OTHER PUBLICATIONS," in Column 1, Line 4, delete "[retreved" and insert -- [retrieved --, therefor.

On Page 2, Item (56), under "OTHER PUBLICATIONS," in Column 2, Line 1, delete "[retreived" and insert -- [retrieved --, therefor.

Signed and Sealed this
Twelfth Day of July, 2016

Michelle K. Lee
*Director of the United States Patent and Trademark Office*